United States Patent [19]

Iida et al.

[11] Patent Number: 4,812,912
[45] Date of Patent: Mar. 14, 1989

[54] FOCUS DETECTION CONDITION DISPLAY DEVICE FOR CAMERA

[75] Inventors: Takashi Iida, Kyoto; Masatoshi Itoh, Takatsuki; Hidenori Fukuoka, Toyonaka; Takeya Tsukamoto, Amagasaki; Masataka Hamada, Osaka; Kenji Ishibashi; Hiroshi Ootsuka, both of Sakai, all of Japan

[73] Assignee: Minolta Camera Kabushiki Kaisha, Osaka, Japan

[21] Appl. No.: 50,390

[22] Filed: May 18, 1987

[30] Foreign Application Priority Data

| May 26, 1986 | [JP] | Japan | 61-78186[U] |
| May 26, 1986 | [JP] | Japan | 61-78187[U] |
| May 26, 1986 | [JP] | Japan | 61-78188[U] |
| Jun. 25, 1986 | [JP] | Japan | 61-147193 |
| Jul. 21, 1986 | [JP] | Japan | 61-169766 |
| Jul. 21, 1986 | [JP] | Japan | 61-169767 |

[51] Int. Cl.$^4$ .............................................. G03B 3/00
[52] U.S. Cl. .................................. 358/227; 354/402
[58] Field of Search ................ 354/400, 402, 409; 358/227

[56] References Cited

U.S. PATENT DOCUMENTS

| 4,475,800 | 10/1984 | Kinoshita et al. | 354/409 |
| 4,557,578 | 12/1985 | Seely | 354/409 |
| 4,599,653 | 7/1986 | Kimura et al. | 358/227 |
| 4,614,975 | 9/1986 | Kaite | 354/402 |
| 4,716,429 | 12/1987 | Misawa | 354/409 |

FOREIGN PATENT DOCUMENTS

| 53-166637 | 12/1978 | Japan . |
| 57-3229 | 1/1982 | Japan . |
| 57-7025 | 1/1982 | Japan . |
| 59-4385 | 1/1984 | Japan . |
| 59-4386 | 1/1984 | Japan . |
| 60-243618 | 12/1985 | Japan . |
| 60-247210 | 12/1985 | Japan . |
| 60-247211 | 12/1985 | Japan . |
| 61-78480 | 5/1986 | Japan . |

Primary Examiner—Russell E. Adams
Attorney, Agent, or Firm—Burns, Doane, Swecker & Mathis

[57] ABSTRACT

A focus detection condition display device suitable for use in a camera provided with an electronic viewfinder. The pattern signal corresponding to a focus detection zone on which focus detection is conducted by a focus detecting system is superimposed on the video signal of the object field and said signal is output to an electronic viewfinder. When the focus detection has become impracticable for such reason as lack of contrast of the object field, or focusing has become impracticable because of the object coming too close to the camera, an alarm is issued by the pattern corresponding to a focus detection zone displayed on the electronic viewfinder displaying in a manner different from that ordinarily used.

17 Claims, 16 Drawing Sheets

(a) IN FOCUS (b) OUT OF FOCUS (FRONT)

(c) OUT OF FOCUS (REAR)

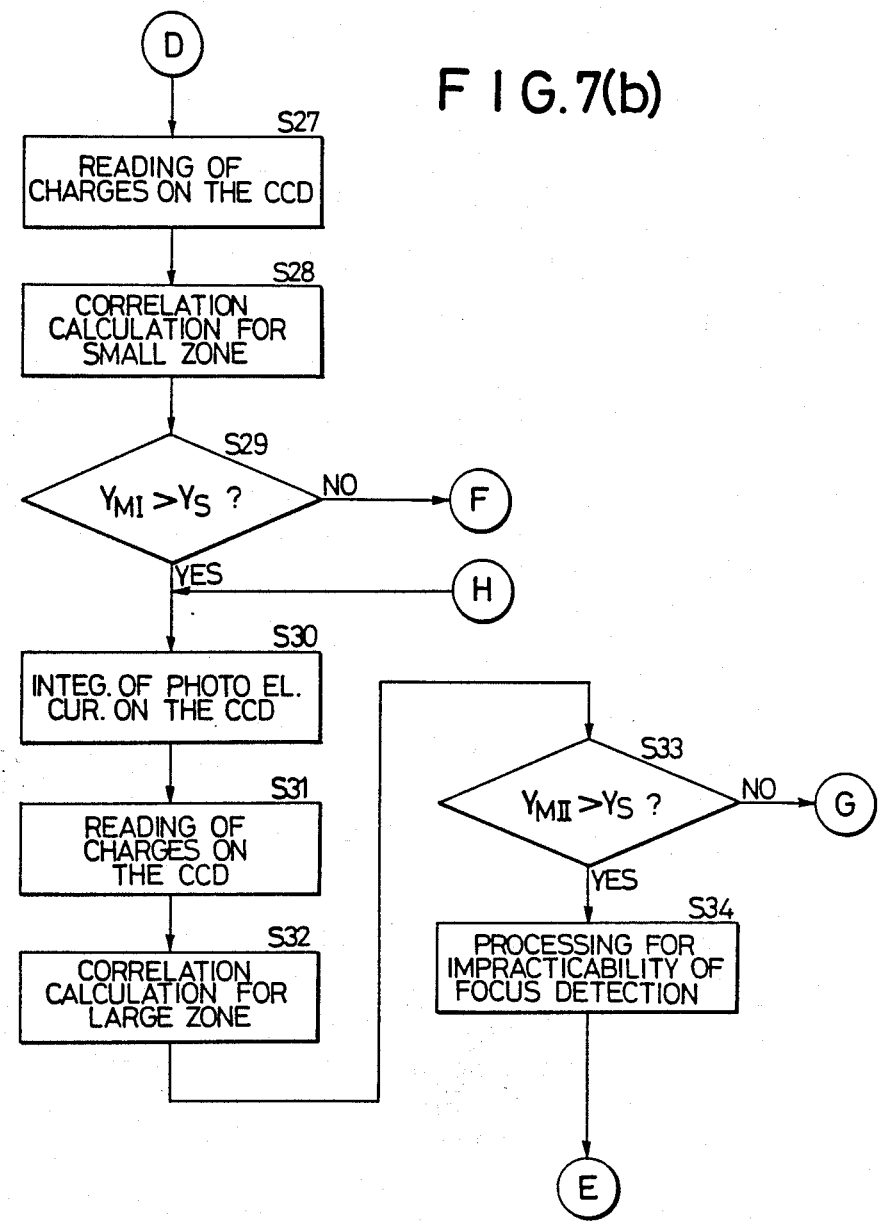

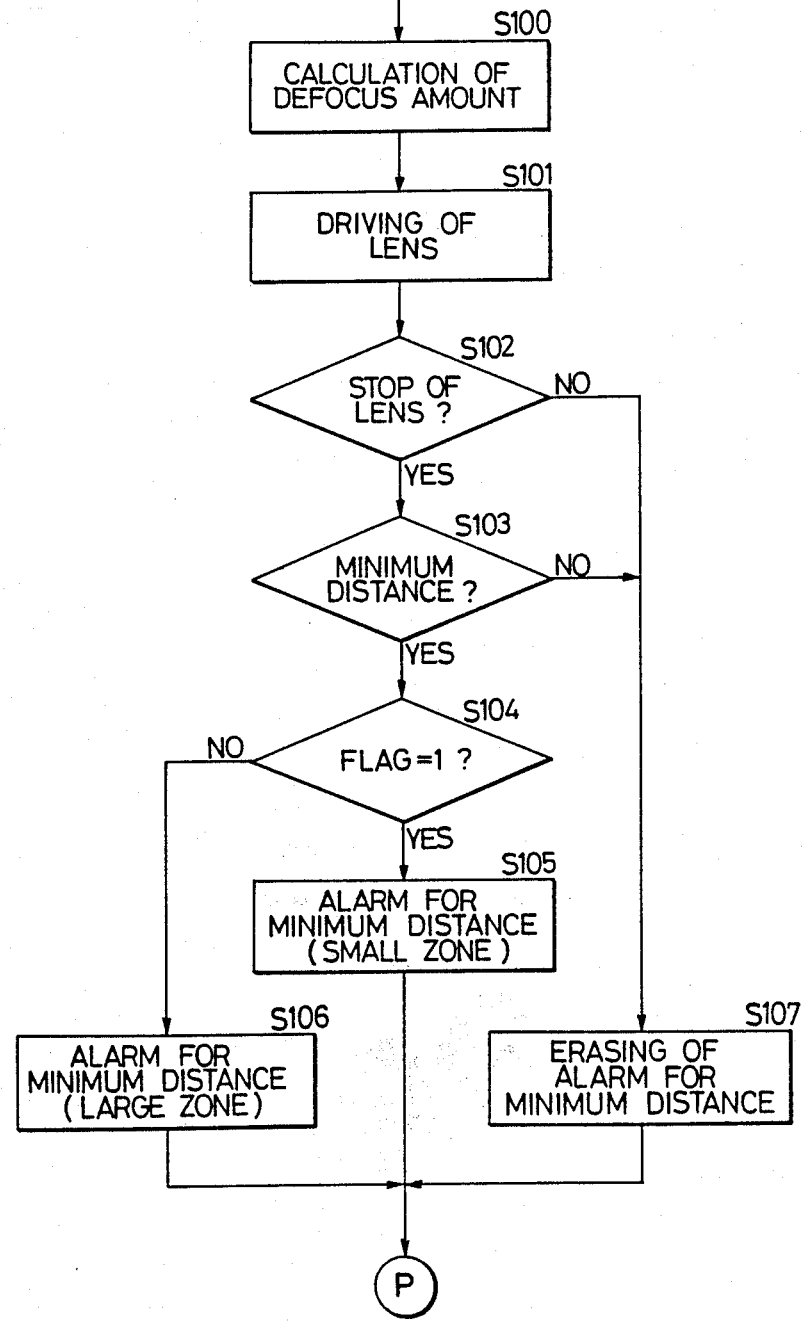

FOCUS DETECTION CONDITION DISPLAY DEVICE FOR CAMERA

BACKGROUND OF THE INVENTION

1. Field of the Invention

The present invention relates to a focus detection condition display device for use in a camera provided with a focus detection device which detects the focus condition of a photographic lens relative to an object within a focus detection area in accordance with the light from the object passing through the photographic lens.

2. Description of the Prior Art

In a video camera provided with an automatic focusing system (hereinafter to be referred to as an AF), when an object in a focus detection area has little difference in brightness between a light part and a dark part therein, i.e., when it lacks contrast, or when the object is dark, the focus detection becomes impracticable. Therefore, there is such a type in which the focus detection area is enabled to be enlarged according to the need, and the focus detection is practiced in normal cases with a narrow focus detection area normally at the center of the viewfinder, and when the focus detection becomes impossible or impracticable, the focus detection area is manually enlarged and therewith the focus detection is practiced again.

Even in a video camera provided with such variable focus detection areas as described above, there is such a type that will not give an alarming display to notify an operator of its impracticability of the focus detection. With such a video camera, the operator tended to continue his photographing work under the same condition even if the AF function was rendered inoperative, and therefore, it was known only after observing the reproduced picture that he had taken an out-of-focus picture.

Also, there is a video camera indicating its impracticability of the focus detection by an LED or the like provided in the vicinity of the side of the viewfinder. With such a camera, however, the operator during his camera work is liable to concentrate his attention upon the central portion of the viewfinder to watch the object through the viewfinder. Thus, it sometimes happened that the operator overlooked the lit LED at the side of the viewfinder and therefore made no change of the focus detection area to produce an out-of-focus picture.

Further, when an object being taken comes so close to a video camera as to exceed the limit of minimum object distance of the photographic lens of the video camera, camera work would be performed under the out-of-focus condition and the AF system becomes inoperative. Therefore, there is a video camera indicating such a condition by an LED or the like provided at the side of the viewfinder.

With such video cameras that are provided with LEDs for giving alarms in the event of the camera becoming inoperative of the focus detection or the object coming closer to the camera than its minimum object distance, the LEDs have had to be disposed in a limited space of the viewfinder to make the arrangement within the viewfinder complex, it is not easy to recognize an alarm because the operator has had to turn his eyes from the focus detection area at the center of the viewfinder to the alarming LED at the side thereof, and further, number of parts would be increased by installing such LEDs and the like in the viewfinder.

SUMMARY OF THE INVENTION

A principal object of the present invention is the provision of a focus detection condition display device for use in a camera capable of displaying in its viewfinder the pattern of the focus detection area corresponding to the focus detection zone which has been used for the focus detection by AF, superimposed upon the image of the object.

Another object of the present invention is the provision of a focus detection area display device for use in a camera giving an alarm in the event of its becoming impracticable of the focus detection depending on a photographing state of the object by displaying in its viewfinder a focus detection area pattern corresponding to the focus detection zone in which the focus detection has become impracticable in a displaying manner different from that ordinarily used.

A further object of the present invention is the provision of a focus detection area display device for use in a camera giving an alarm in the event of the object coming closer to the camera than the minimum object distance of the photographic lens by displaying in its viewfinder a focus detection area pattern in a displaying manner different from that ordinarily used.

Other features and advantages of the invention will be apparent from the following description taken in connection with the accompanying drawings wherein:

DETAILED DESCRIPTION OF THE PREFERRED EMBODIMENTS

Figure 1:
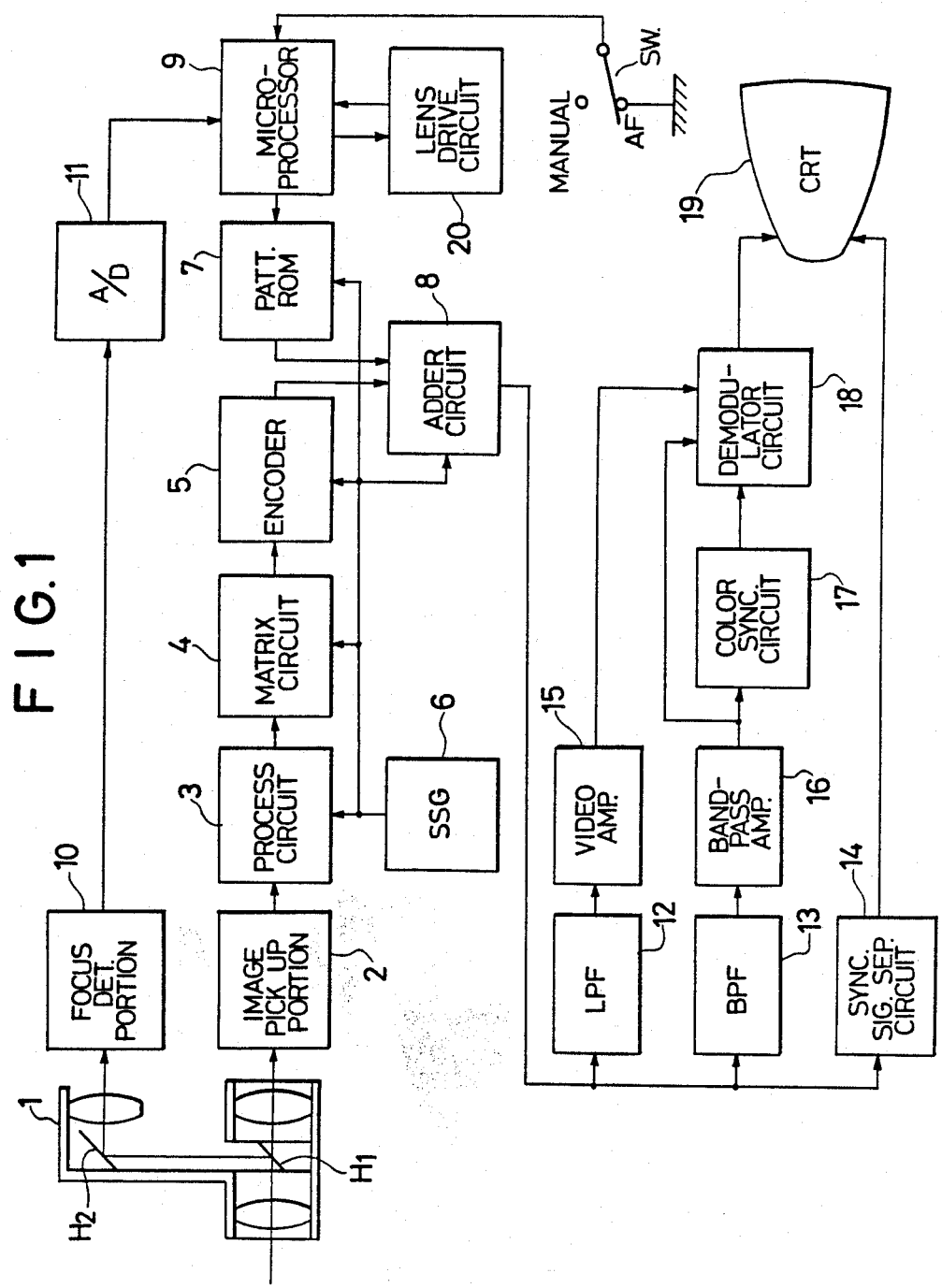
FIG. 1 is a block diagram showing a circuit of a focus detection condition display device of the present invention.

A preferred embodiment of the present invention will be described below.

To begin with, description will be given based on a circuit block diagram shown in FIG. 1 which indicates an overall arrangement of a focus detection condition display device of the present invention. Referring to the figure, reference numeral 1 denotes an optical system for image pickup and focus detection, 2 denotes an image pickup portion, and light incident from an object through the optical system 1 is focused on the image pickup portion 2, wherein the light incident from an object is converted into an electrical signal by known means, scanned by suitable scanning means, and output therefrom as a video signal. Reference numeral 3 denotes a process circuit for providing the incoming video signal with color corrections such as gamma correction and white balance correction and other processes such as automatic gain control. Reference numeral 4 denotes a matrix circuit for converting the processed video signal incoming thereto into a color difference signal. Reference numeral 5 denotes an encoder for converting the input color difference signal into an NTSC signal.

Reference numeral 7 denotes a pattern ROM storing therein such data as pattern data for focus detection area display used for displaying focus detection areas in an electronic viewfinder and pattern data for alarming display.

These pattern data are addressed and read out by a later discussed microprocessor 9 and supplied to an adder circuit 8.

Reference numeral 10 denotes a focus detection portion formed of a one-dimensional CCD line sensor, which will be described in detail later on. Reference numeral 11 denotes an A/D converter for converting the output from the focus detection portion 10 into a digital signal.

The microprocessor 9 is, as described later, for performing various calculation and control concerning focus detection such as establishment of focus detection zones on a standard portion on the CCD line sensor constituting the focus detection portion, calculation of correlation amounts between detected signals, decision as to whether focus detection is possible or not, reading of data for focus detection area display patterns from the pattern ROM 7 and display of the same in the viewfinder, and calculation of defocus amount of the photographic lens.

The adder circuit 8 is for adding the NTSC signal which is the video signal output from the encoder 5 and the data signal for such pattern as the focus detection area display pattern and alarming display pattern output from the pattern ROM 7.

Reference numeral 12 denotes a low-pass filter, 13 denotes a band-pass filter, and 14 denotes a synchronous signal separation circuit, and these three circuits receive the signal output from the adder circuit 8. The signal passed through the low-pass filter 12 is input by way of a video amplifier 15 to a demodulator circuit 18 as a brightness signal. The signal passed through the band-pass filter 13 is made into a carrier chrominance signal by way of a band-pass amplifier 16 and into a burst signal by way of a color synchronizing circuit 17, and these signals are input to the demodulator circuit 18. In the synchronous signal separation circuit 14, a horizontal synchronizing signal and a vertical synchronizing signal are separated from the NTSC signal.

Reference numeral 19 denotes a CRT forming the electronic viewfinder, which receives the output from the demodulator circuit 18 and the horizontal and vertical synchronizing signals output from the synchronous signal separation circuit 14 and displays the image of the object on the CRT with the focus detection area pattern superimposed thereupon.

Further, reference numeral 6 denotes a synchronous signal generator (SSG) which generates a signal for synchronizing the process circuit 3, matrix circuit 4, encoder 5, pattern ROM 7, and the adder circuit 8 with one another. And, reference numeral 20 denotes a photographic lens drive circuit.

Constitution of the focus detection portion will now be described.

Figure 2:
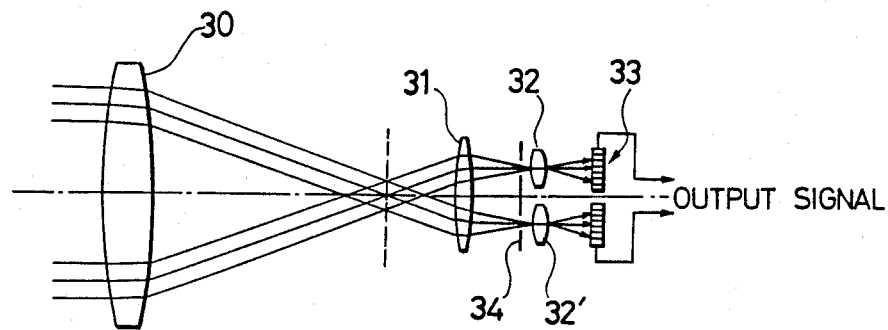
FIG. 2 is an explanatory drawing of an optical system of a focus detection portion.

FIG. 2 indicates the constitution of the focus detection portion together with the optical system, wherein 30 denotes a photographic lens, 31 denotes a condenser lens, 32 denotes a pair of re-imaging lenses (relay lenses), 33 denotes a CCD line sensor, and 34 denotes an aperture mask for the relay lenses 32.

Figure 3:
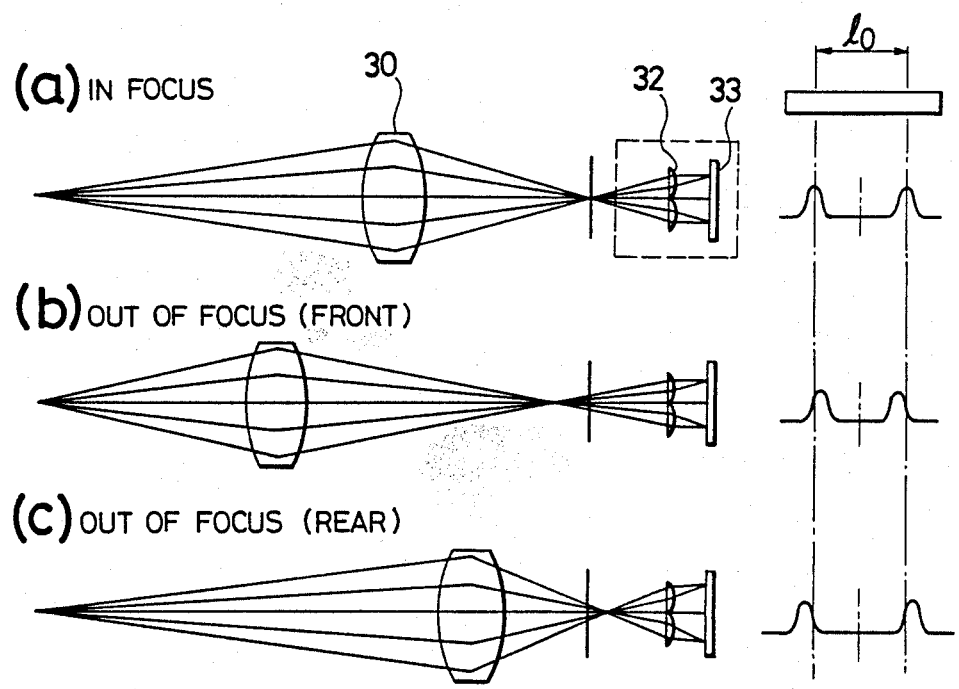
FIGS. 3 (a), (b), and (c) are explanatory drawings of the states of focus detection.

Light from the object passed through predetermined pupil positions of the photographic lens 30 is passed through the aperture masks 34 and imaged by the pair of re-imaging lenses 32 on two regions, i.e., the standard portion and the reference portion, established on the CCD line sensor 33. The distance between the two images formed on the CCD line sensor 33, when the distance in the in-focus case is represented by $l_0$ as indicated in FIG. 3, becomes shorter than $l_0$ in the case of out-of-focus (Front) and longer than $l_0$ in the case of out-of-focus (Rear). And, the distance between the images is virtually proportional to the defocus amount. Therefore, the condition whether in-focus or out-of-focus and the defocus amount in the out-of-focus condition can be known by detecting the distance between these images.

The relationship between the standard portion and the reference portion established on the CCD line sensor 33 and the focus detection zones to be established on the standard portion will be described with reference to FIG. 4.

Incidentally, the standard portion, reference portion and focus detection zones on the standard portion are established by the programs in the microprocessor which will be explained later.

To the standard portion, 35 picture elements $l_1$ to $l_{35}$ of the picture elements on the CCD line sensor are allocated, and to the reference portion, 39 picture elements $r_1$ to $r_{39}$ are allocated. On the other hand, for the focus detection zones, two zones, wide and narrow zones, are prepared, of which the narrow focus detection zone will be called the small zone and the wide focus detection zone will be called the large zone. To the small zone, 17 picture elements $l_{10}$ to $l_{26}$ of the CCD line sensor are allocated, and this is a zone which is labeled with "I" in FIG. 4 and uses 13 pieces of data from differential data $ls_{10}$ of outputs of two picture elements $l_{10}$ and $l_{14}$ of the CCD picture elements three picture elements apart to differential data $ls_{22}$ of outputs of two corresponding picture elements $l_{22}$ and $l_{26}$. And, to the large zone, 35 picture elements $l_1$ to $l_{35}$ of the CCD line sensor are allocated, and this is a zone which is labeled with "II" in FIG. 4 and uses 31 pieces of data from differential data $ls_l$ of outputs of two picture elements $l_1$ and $l_5$ of the CCD picture elements three picture elements apart to differential data $ls_{31}$ of outputs of two corresponding picture elements $l_{31}$ and $l_{35}$.

Figure 4:
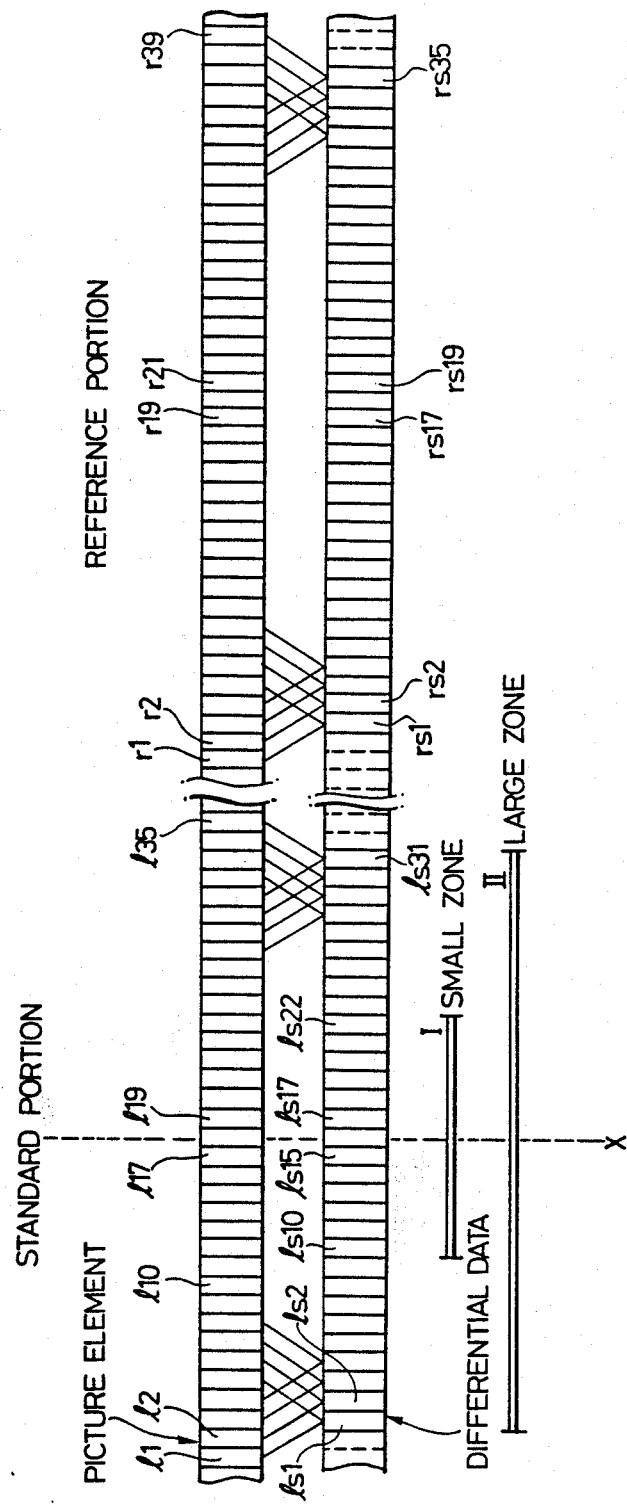
FIG. 4 is an explanatory drawing of a CCD line sensor and a standard portion, a reference portion, and focus detection zones established on the same.

Reference character X in FIG. 4 denotes the optical fiducial point (optical axis). As seen from this figure, both the small zone I and the large zone II are established with the optical fiducial point X in the center.

Figure 5:
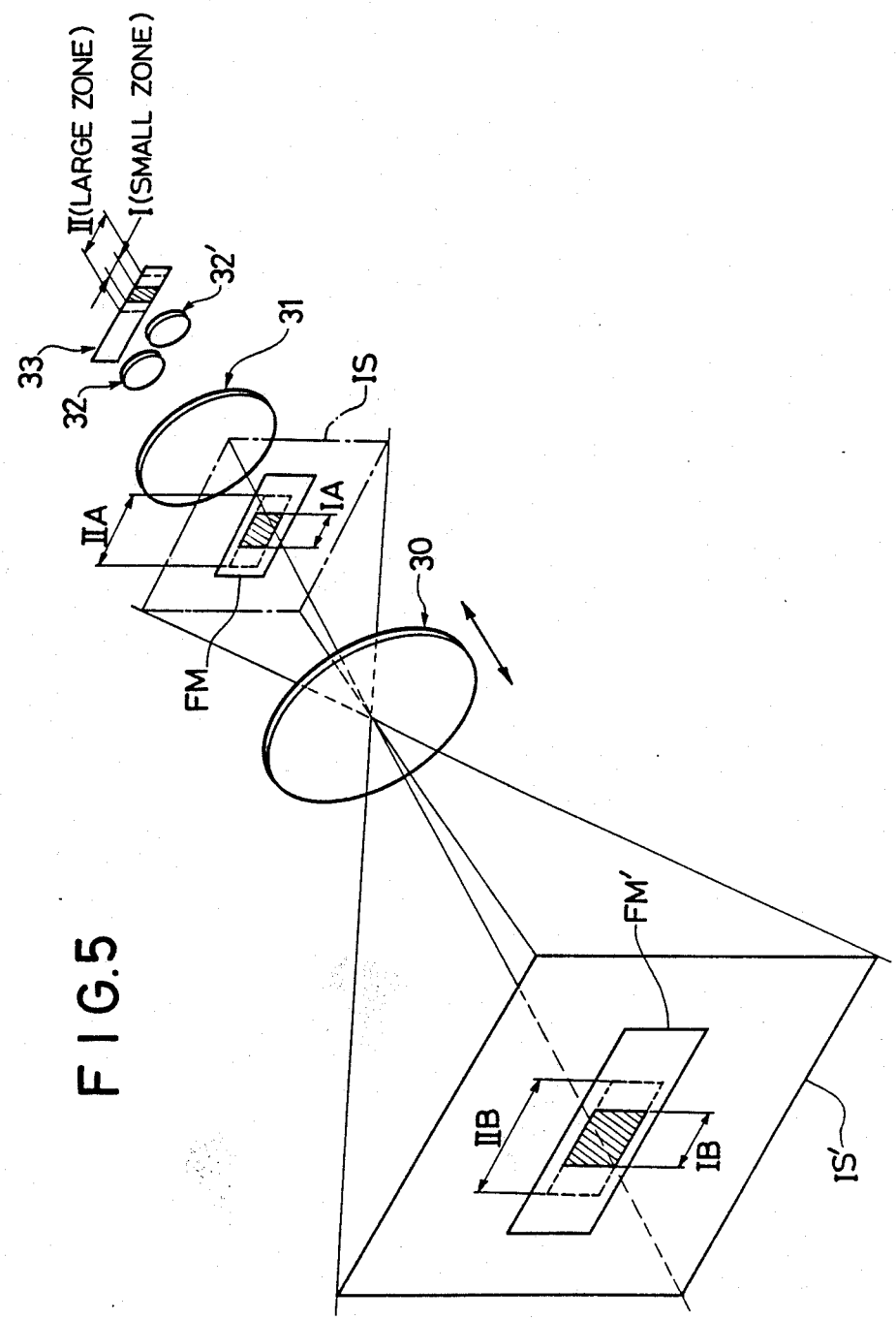
FIG. 5 is an explanatory drawing of relationship between focus detection zones on a CCD line sensor and focus detection areas on an object.

FIG. 5 shows correspondence between the focus detection zones I and II established on the CCD line sensor 33 and the focus detection areas on the object. IS indicates the picture taking region of the image pickup portion 2 placed on the expected focal plane of the photographic lens 30 and the region indicated by IS' projected therefrom on the object by the photographic lens 30 is the picture taken plane (the picture taken region on the object).

Although, in FIG. 5, the picture taking region IS is indicated by one dot chain line superimposed with the optical system for focus detection, but, in reality, they are separated from each other as shown in FIG. 1 by half mirrors $H_1$ and $H_2$. FM denotes a visual field mask placed adjacent to the expected focal plane of the photographic lens 30 and FM' denotes the image of the view field mask projected on the object by the photographic lens 30. And, the regions IA and IIA are projection of the small zone I and the large zone II on the CCD line sensor 33 made on the expected focal plane of the photographic lens 30 by either one relay lens 32' of the pair and the condenser lens 31, and the regions IA and IIA correspond to the focus detection areas on the expected focal plane when, respectively, the small zone I and the large zone II are used. Further, the regions IB and IIB which are projection of the regions IA and IIA made on the object by the photographic lens 30 correspond to the focus detection areas on the object when, respectively, the small zone I and the large zone II are used. Since the electronic viewfinder displays in its finder the image of the picture taken plane IS' corresponding to the picture taking region IS, the operator can be correctly informed of the focus detection area on the object by adapting such that the focus detection area as indicated by IB is displayed in the viewfinder while the focus detection is made on the small zone I, and the focus detection area as indicated by IIB is displayed in the viewfinder while the focus detection is made on the large zone II.

Now, calculations made in the microprocessor 9 concerning detection of the contrast of the object in the focus detection area, switching of the focus detection zones, and display of focus detection areas will be described.

Whether the above described small zone I or the large zone II is selected depends on whether or not the focus detection is possible. The judgment whether the photographic lens directed to an object is in an in-focus condition or in an out-of-focus condition is decided through detection of the displacement in the phases of the output signals from the standard portion and the reference portion established on the CCD line sensor. Accordingly, when the difference in brightness among points on the object is small, i.e., when it lacks contrast, or when the object is dark, the difference among the outputs from each of the picture elements of the CCD becomes small. And therefore, focus condition detection by taking the correlation between the outputs from the standard portion and those from the reference portion, affected further by noise or the like, becomes difficult. Thus, when the best correlation amount between the standard portion and the reference portion has been obtained, if its normalized value by the contrast exceeds a predetermined value, the best correlation amount is judged unreliable. In such case, without calculating the distance between the images, i.e., the defocus amount (or without using the result if such calculation has been made), the process is repeated with the focus detection area enlarged.

Details of the calculation will be described below.

First, differential data of outputs of two picture elements of the CCD picture elements three picture elements apart are obtained for each of the standard portion and the reference portion.

Namely, the differential data $l_{sk}$ for the standard portion are obtained by $$l_{sk} = l_k - l_{(k+4)},$$

where k=1-31, and the differential data $r_{sk}$ for the reference portion are obtained by $$r_{sk} = r_k - r_{(k+4)},$$

where k=1-35.

Then, summation of differences of two neighboring differential data at the standard portion are taken as the measure of contrast.

Namely, contrast $C_I$ in the small zone I is obtained from $$C_I = \sum_{k=10}^{21} |l_{sk} - l_{s(k+1)}| \quad (1)$$

And, contrast $C_{II}$ in the large zone II is obtained from $$C_{II} = \sum_{k=1}^{30} |l_{sk} - l_{s(k+1)}| \quad (2)$$

Then, the correlation amounts between the standard portion and the reference portion are obtained. That is, the correlation amounts for the small zone $H_I(l)$ are obtained from $$H_I(l) = \sum_{k=1}^{13} |l_{s(k+9)} - r_{s(k+l)}| \quad (3)$$

where l=0-22.

Out of the correlation amounts $H_I(0)$ - $H_I(22)$ obtained for each of l=0-22, the minimum one, $H_I(l_{MI})$, is obtained as that for the portion having the highest correlation. That is, $$H_I(l_{MI}) = \text{Min } [H_I(0), \ldots, HI(23)] \quad (4)$$

Here, when $l_{MI}=11$, the case is in-focus condition, and the difference between this value and the actual value of (MI corresponds to the defocus amount.

Then, judgment is made as to whether the thus obtained best correlation value $H_I(l_{MI})$ is reliable or not, in other words, whether the distance between the images and the defocus amount calculated based upon that value (results of the focus detection) are reliable or not. For this purpose, the best correlation value $H_I(l_{MI})$ obtained by the above equation (4) is normalized with the contrast $C_I$ in the standard portion obtained by the above equation (1). The normalization is made so that judgment at a constant level may be made even if the value $H_I(l_{MI})$ is varied on account of change in the accumulated electric charge on the CCD responding to the brightness of the object.

The normalized best correlation amount is expressed by $$Y_{MI} = H_I(l_{MI})/C_I \qquad (5)$$

and this is compared with a preset reference level $Y_S$. As the result of the comparison, if $$Y_{MI} \leq Y_S \qquad (6)$$

then the focus detection with the small zone is judged possible (the results of the focus detection are considered to be reliable). And, if $$Y_{MI} > Y_S \qquad (7)$$

then the detection with the small zone is judged impossible (the results of the focus detection are considered to be unreliable). That is, generally, when the brightness of the object is low, the S/N ratio of the CCD output becomes low and the results of the focus detection become unstable, and then in the equation (5), the value $C_I$ becomes smaller and the value $Y_{MI}$ becomes larger. Also, in the case where the object is such as a wall without patterns thereon and lacks contrast, the differences between the differential data of the CCD outputs become smaller and hence the value $Y_{MI}$ becomes larger.

When the focus detection with the small zone is judged to be impracticable according to the above equation (7), the focus detection zone is switched to the large zone.

With the large zone, similarly to the case with the small zone, the correlation amounts between the outputs in the standard portion and those in the reference portion are obtained. The correlation amounts for the large zone $H_{II}(l)$ are obtained from $$H_{II}(l) = \sum_{k=1}^{31} l_s(k) - r_s(k+l) \qquad (8)$$

where $l = 0-4$.

Out of the correlation amounts $H_{II}(0)-H_{II}(4)$ obtained for each of $l=0-4$, the least one, $H_{II}(lMII)$ is obtained as the best correlation amount.

$$H_{II}(lMII) = \text{Min} [H_{II}(0), \ldots, H_{II}(4)] \qquad (9)$$

Then, this value is normalized with the contrast $C_{II}$ obtained from equation (2).

$$Y_{MII} = H_{II}(l_{MII}) / C_{II} \qquad (10)$$

The value $Y_{MII}$ is compared with a preset reference value $Y_S$. If $$Y_{MII} \leq Y_S \qquad (11)$$

then the focus detection is possible. If not, the focus detection is judged to be impracticable, and a step for displaying the alarm for impracticability of focus detection is taken.

Figure 6A:
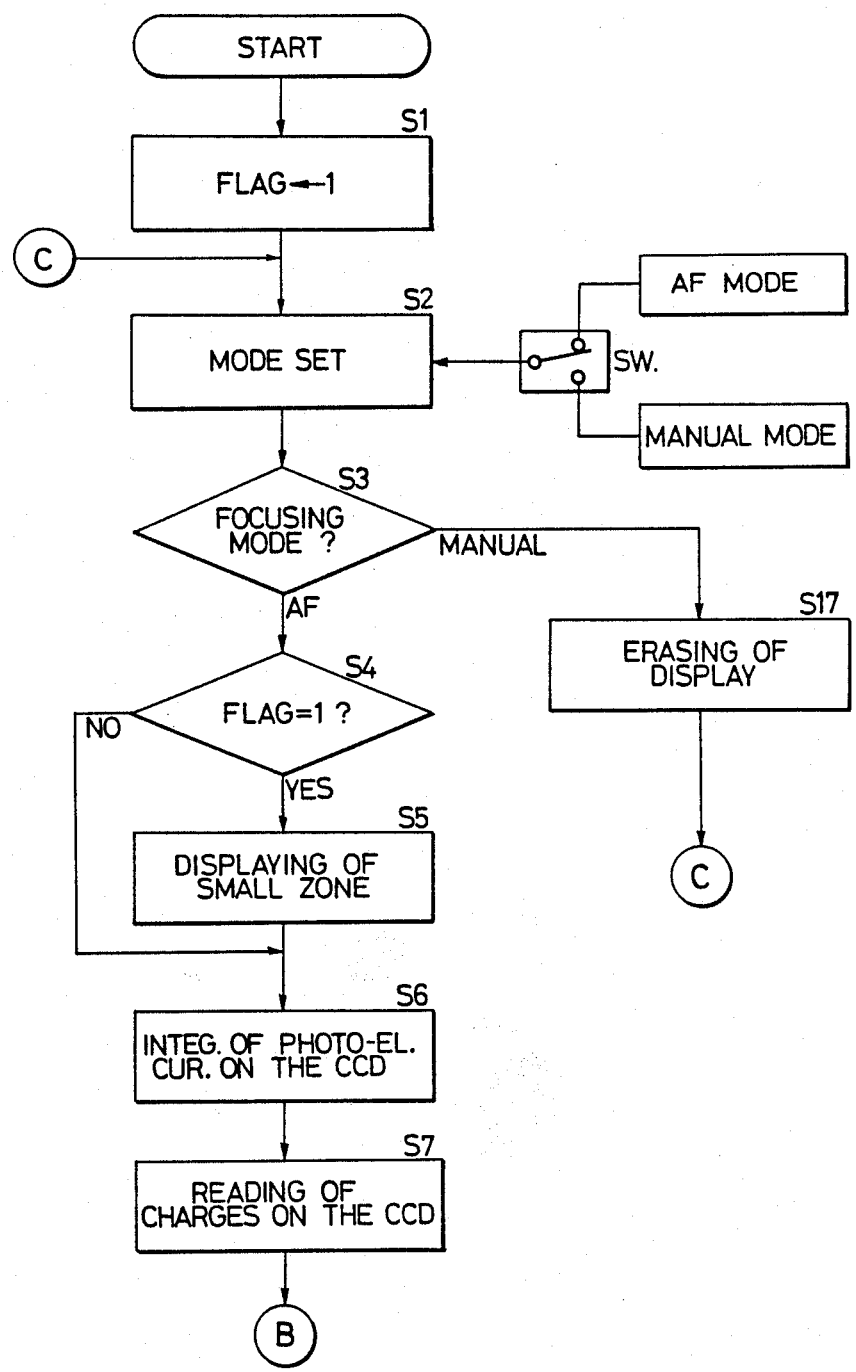
FIG. 6 is a flow chart showing a first example of data processing made in a microprocessor for switching of focus detection zones and displaying of focus detection areas in an electronic viewfinder.
Figure 6B:
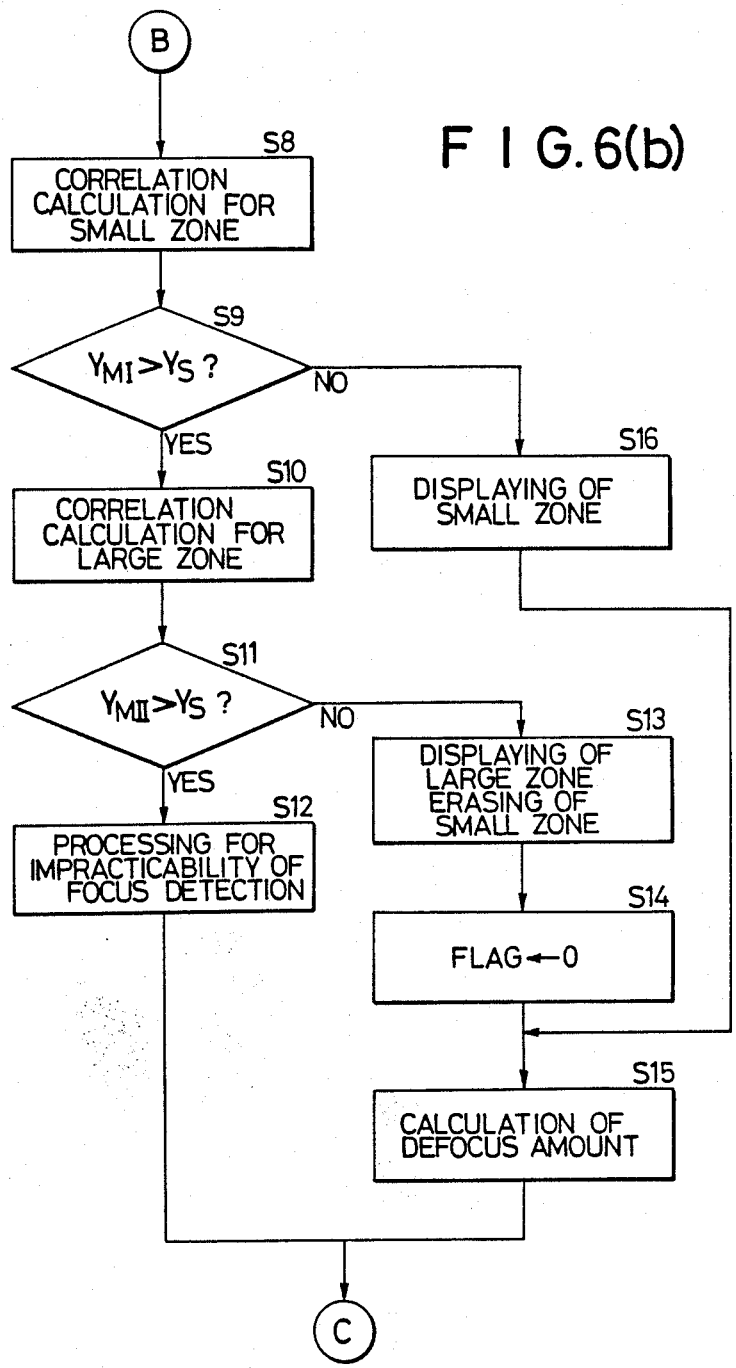

Now, with reference to a flow chart shown in FIG. 6, a first example of the processing made by the microprocessor for the switching of the focus detection zones and for the displaying of the focus detection areas in the electronic viewfinder will be described.

In the present example, the description will be made presupposing that selection and setting of the focusing mode has previously been made either to automatic focusing (AF) or to manual focusing by means of a switch SW operable from outside the camera.

Upon turning on of a camera operating switch not shown and starting up of the camera, a small zone display flag F is first set up (F←1) for enabling the focus detection area corresponding to the small zone I to be displayed in the viewfinder (step S1). Then, the focusing mode is read and set from the state of the switch SW (step S2). The focusing mode is detected (step S3), and if the mode set is found to be AF, the program proceeds to step S4 and therein it is checked whether there is set the small zone display flag F. If the flag is found set, the focus detection area display pattern for the small zone is displayed in the viewfinder (step S5). This is carried out by the microprocessor delivering a predetermined address to the pattern ROM 7, reading out the data for the focus detection area display pattern from the predetermined address, and outputting the same to the adder circuit 8 (refer to FIG. 1). In case the flag F is found not set in step S4, step S5 is skipped over.

In step S6, integration of photo-electric current produced by light incident on the CCD is performed and after the completion of the integration, the electric charges on the all CCD picture elements are transferred to the microprocessor 9 through A/D converter 11 (step S7), and the correlation calculation for the small zone is carried out (step S8). This calculation is performed with the signals output from the CCD picture elements of the standard portion and the reference portion established by the program of the microprocessor on the line sensor and of the focus detection zone for the small zone established on the same.

First, as described above, the differential data $l_{sk}$ and $r_{sk}$ of outputs of two picture elements three picture elements apart of the CCD picture elements are obtained, for the standard portion and the reference portion.

Then, the contrast $C_I$ of the small zone is obtained according to the above described equation (1), and further the correlation amounts $H_I(l)$ between the standard portion and the reference portion are obtained according to equation (3), and out of which the best correlation amount $H_I(l_{MI})$ is obtained from equation (4). Finally, normalized amount $Y_{MI}$ of the same is obtained according to equation (5) to finish the correlation calculation.

In the next step S9, the above obtained normalized correlation value $Y_{MI}$ is compared with the preset reference value $Y_S$ for determining whether the focus detection is possible or not. If, as the result of this, $Y_{MI} > Y_S$, it is thereby indicated that there is no object present which enables the focus detection in the focus detection area corresponding to the small zone, and therefore, the correlation calculation for the large zone is then performed at step S10. That is, as described above, based on the differential data obtained from the CCD picture elements of the large focus detection zone on the standard portion and of the reference portion, which are established by the program of the microprocessor on the CCD line sensor, the contrast $C_{II}$ of the object in the focus detection area corresponding to the large zone is obtained according to equation (2), the correlation amounts $H_{II}(l)$ between the standard portion and the reference portion are obtained according to equation (8), and out of which the best correlation amount $H_{II}(l-M_{II})$ is obtained according to equation (9). Finally, the normalized value $Y_{MII}$ of the same is obtained according to equation (10) to finish the correlation calculation for the large zone (step S10).

Then, in step S11, the above obtained normalized correlation amount YMII is compared with the preset reference value YS for judgment whether the focus detection is possible or not. As the result of this, if $Y_{MII} > Y_S$, it is thereby indicated that there is also no object enabling the focus detection present in the focus detection area corresponding to the large zone, and therefore, in the next step S12, processing is made for indicating impracticability of the focus detection, e.g., making an alarming display for the impracticability of the focus detection, emitting an alarm sound, or the like. The program then returns to step S2 to execute next sequence.

In step S11, if $Y_{MII} \leq Y_S$, i.e., if the focus detection is judged to be possible, the program transfers to step S13, and therein, the focus detection area display pattern corresponding to the small zone in the viewfinder is erased and the focus detection area display pattern corresponding to the large zone is displayed. This is attained, similarly to the case of the small zone, by the microprocessor reading out the display pattern data from the predetermined address of the pattern ROM and delivering the same to the adder circuit 8. Thereafter the small zone display flag is reset (step S14). This is done for discontinuing the display in the viewfinder of the focus detection area pattern corresponding to the small zone since there is present no object enabling the focus detection in the focus detection area corresponding to the small zone.

Then, in step S15, the defocus amount is calculated according to predetermined algorithm. A lens drive mechanism not shown is operated based on the thus obtained defocus amount so that the photographic lens is moved to the in-focus position. After the calculation of the defocus amount has been finished, the program returns to step S2 for execution of next sequence.

The details of calculation of the defocus amount, which are not directly connected with the present invention and therefore explanation thereof is omitted here, are disclosed in the publication of Japanese Patent Laid-open No. 60-4914.

In step S9, if $Y_{MI} \leq Y_S$, i.e., the focus detection in the focus detection area corresponding to the small zone is judged to be possible, the program transfers to step S16, wherein the focus detection area display pattern corresponding to the small zone is displayed in the viewfinder by the same processing to that made in step S5. Thereafter, in step S15, the calculation of the defocus amount is performed.

In the case where the set mode for focus detection is found to be manual in step S3, the program transfers to step S17, and therein, the focus detection area display pattern in the viewfinder is erased and expresses the manual mode, and the program returns to step S2.

Figure 10:
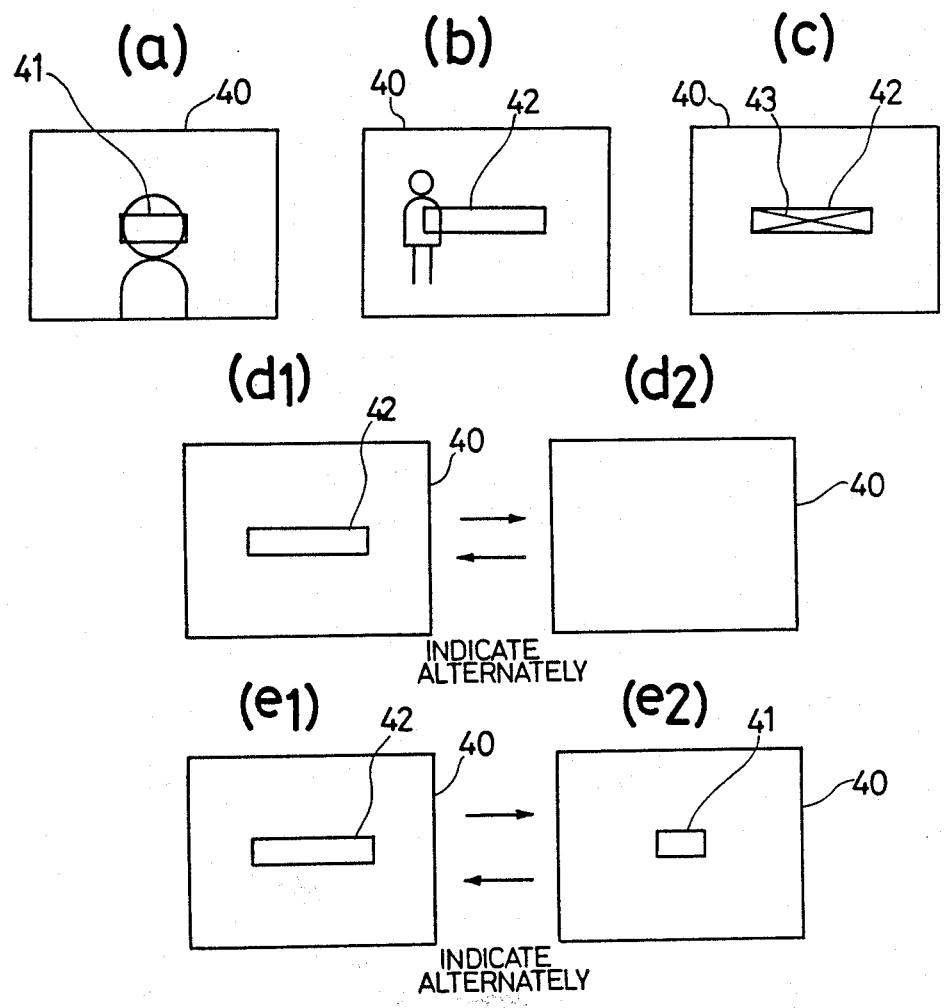
FIGS. 10 (a) and (b) are examples of focus detection areas displayed in a viewfinder, FIG. 10 (c) is an example of a display of an alarm for impracticability of focus detection displayed in the viewfinder, and FIGS. 10 ($d_1$), ($d_2$) and FIGS. 10 ($e_1$), ($e_2$) are other examples of alarming displays for impracticability of focus detection displayed in the viewfinder.

Appearances of the view field 40 on the electronic viewfinder displayed the focus detection area display patterns therein are shown in FIGS. 10 (a) and (b). FIG. 10(a) shows the case in which a pattern corresponding to the small zone 41 is displayed as the focus detection area display pattern, and FIG. 10(b) shows a case where a pattern corresponding to the large zone 42 is displayed as the display pattern.

Figure 7A:
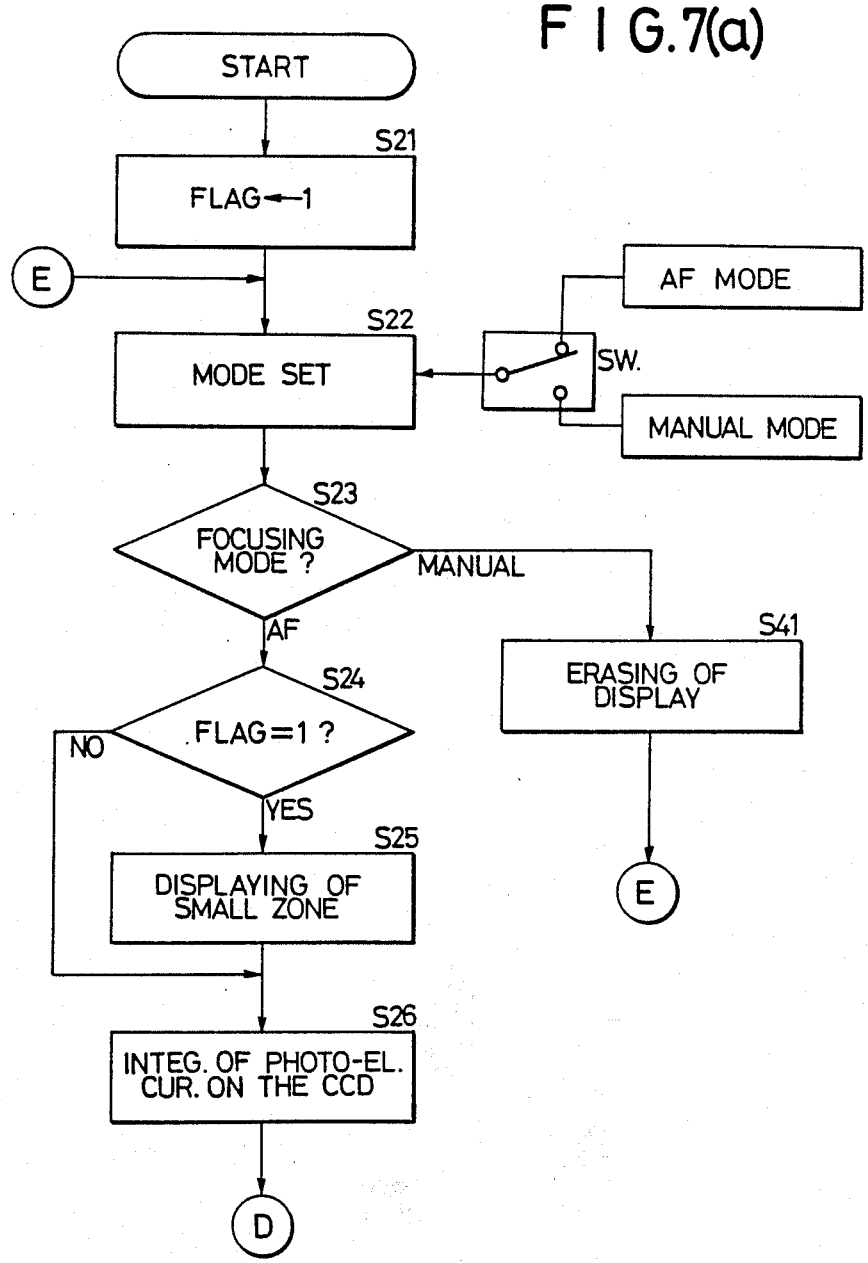
FIG. 7 is a flow chart showing a second example of data processing made in a microprocessor for switching of focus detection zones and displaying of focus detection areas in an electronic viewfinder.
Figure 7C:
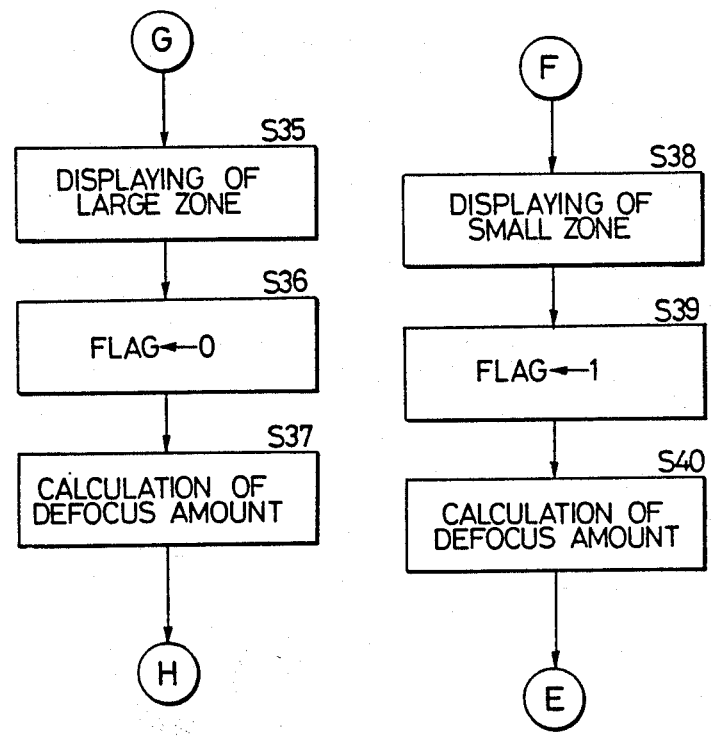

Now, with reference to a flow chart shown in FIG. 7, a second example of the processing made by the microprocessor for the switching of the focus detection zones and for the displaying of the focus detection areas in the electronic viewfinder will be described.

In this example, when focus detection is impracticable on the small zone established on the CCD line sensor, focus detection operation is carried out on the large zone, and if focus detection is impracticable on the large zone, focus detection operation is continued by switching the small zone and large zone repeatedly. But, the focus detection area pattern displayed previously on the electronic viewfinder is displayed continually until the focus detection is judged to be possible.

In the flow chart shown in FIG. 7, since the data processing from step S21 to step S28 are substantially same to the data processing from step S1 to step S8 shown in the flow chart of FIG. 6, therefore, explanation will be made from step S29.

In step S29, normalized correlation value YMI for small zone (which is calculated in step S28) is compared with the preset reference value $Y_S$ for determining whether the focus detection is possible or not.

If, as the result of this $Y_{MI} > Y_S$, it is thereby indicated that there is no object present which enables the focus detection in the focus detection area corresponding to the small zone.

Therefore, again integration of photo-electric current produced by light incident on the CCD is performed (step S30) and after the completion of the integration, the electric charges on the all CCD picture elements are transferred to the microprocessor 9 through A/D converter 11 (step S31), and the correlation calculation for the large zone is carried out (step S32). Since this calculation is same as the calculation described in the explanation of the step S10 shown in the flow chart of FIG. 6, detailed explanation is omitted but normalized correlation value $Y_{MII}$ for large zone is obtained in the above step S32.

Then, in step S33, the above obtained normalized correlation amount YMII is compared with the preset reference value $Y_S$ for judgment whether the focu. detection is possible or not. As the result of this, if $Y_{MII} > Y_S$, it is thereby indicated that there is also no object enabling the focus detection present in the focus detection area corresponding to the large zone, and therefore, in the next step S34, processing is made for indicating impracticability of the focus detection, e.g., making an alarming display for the impracticability of the focus detection, emitting an alarm sound, or the like. The program then returns to step S22 to execute next sequence.

In step S33, if $Y_{MII} \leq Y_S$, i.e., if the focus detection is judged to be possible, the program transfers to step S35, and therein, the focus detection area display pattern corresponding to the large zone is displayed. This is attained, similarly to the case of the small zone, by the microprocessor reading out the display pattern data from the predetermined address of the pattern ROM and delivering the same to the adder circuit 8. Thereafter the small zone display flag F is reset (F←0) (step S36). This is done for discontinuing the display in the viewfinder of the focus detection area pattern corresponding to the small zone since there is present no object enabling the focus detection in the focus detection area corresponding to the small zone, and furthermore, it is done for continuing the display in the viewfinder of the focus detection area pattern corresponding to the large zone unless focus detection is judged to be possible in next focus detection operation.

Then, in step S37, the defocus amount is calculated according to predetermined algorithm. A lens drive mechanism not shown is operated based on the thus obtained defocus amount so that the photographic lens is moved to the in-focus position. After the calculation of the defocus amount has been finished, the program returns to step S30 for execution of next sequence.

In step S29, if $Y_{MI} \leq Y_S$, i.e., the focus detection in the focus detection area corresponding to the small zone is judged to be possible, the program transfers to step S38, wherein the focus detection area display pattern corresponding to the small zone is displayed in the viewfinder by the same processing to that made in step S25. Thereafter, in step S39, the small zone display flag F is set (F←1). This is done because flag F is reset in step S36 when focus detection is judged to be possible in large zone.

Furthermore, it is done for continuing the display in the viewfinder of the focus detection area pattern corresponding to the small zone unless focus detection is judged to be possible in next focus detection operation. Program transfers to step S40, calculation of defocus amount is performed, and returns to step S22 for execution of next sequence.

Appearances of the view field 40 on the electronic viewfinder displayed the focus detection area display patterns therein are same to those in case of the first example of the processing.

Figure 8A:
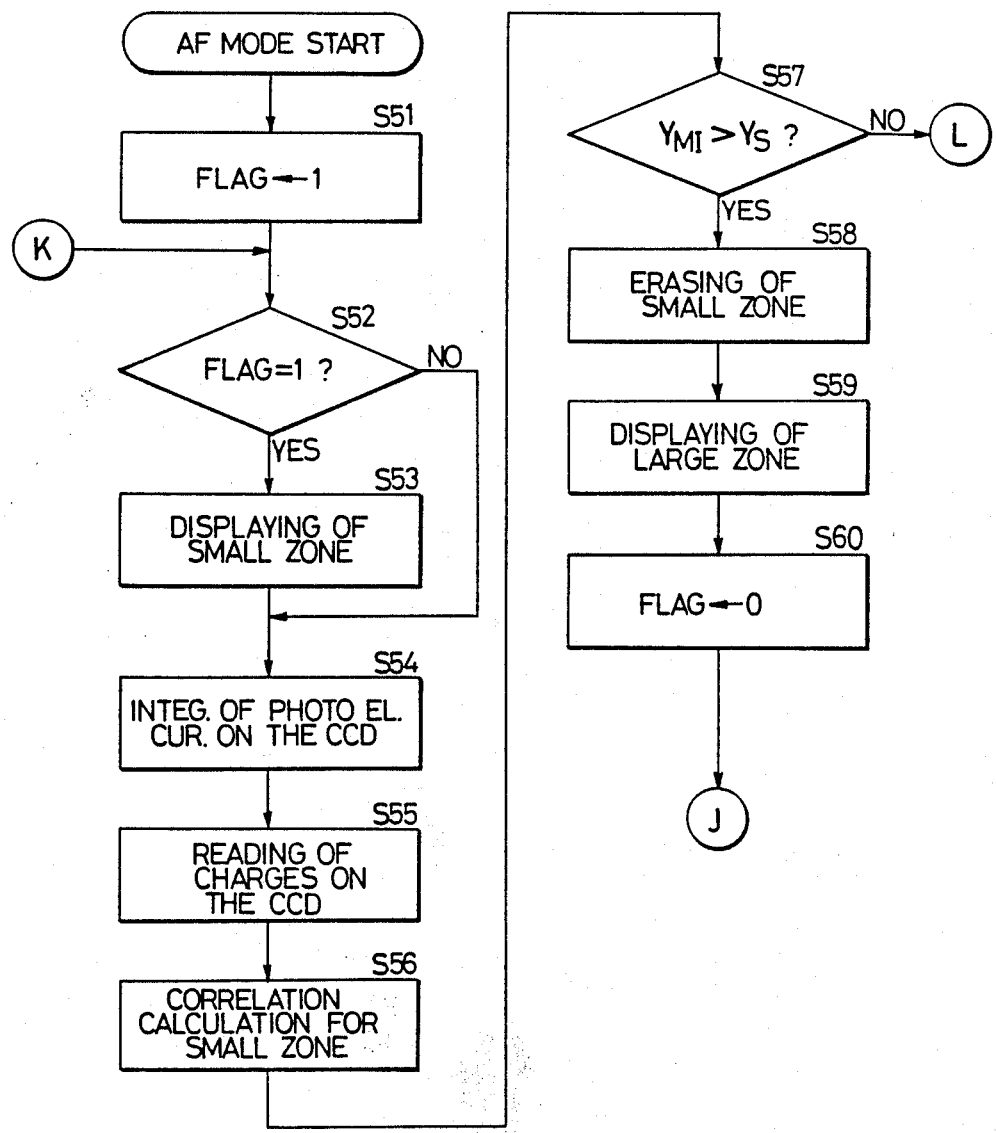
FIG. 8 a flow chart showing a third example of data processing made in a microprocessor for switching of focus detection zones and displaying of focus detection areas in an electronic viewfinder.
Figure 8B:
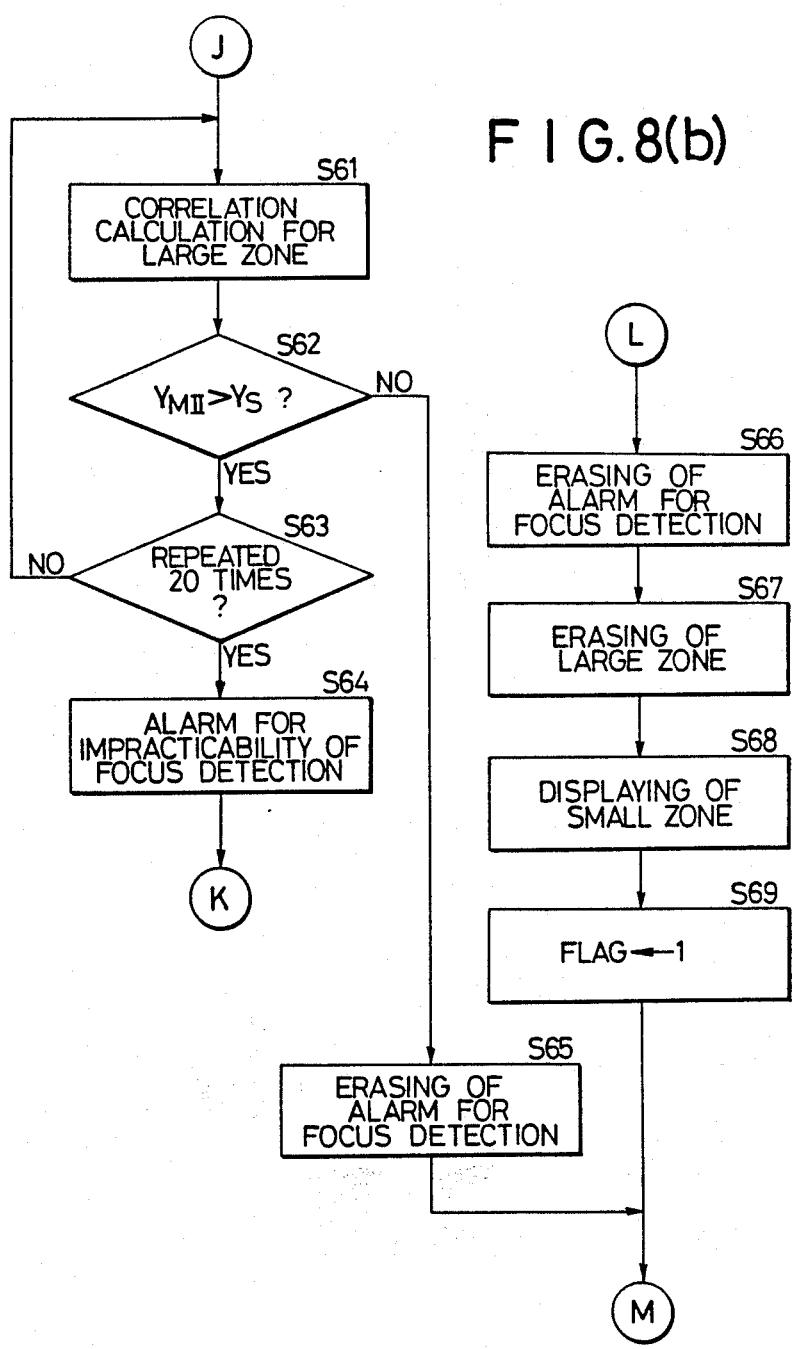
Figure 8C:
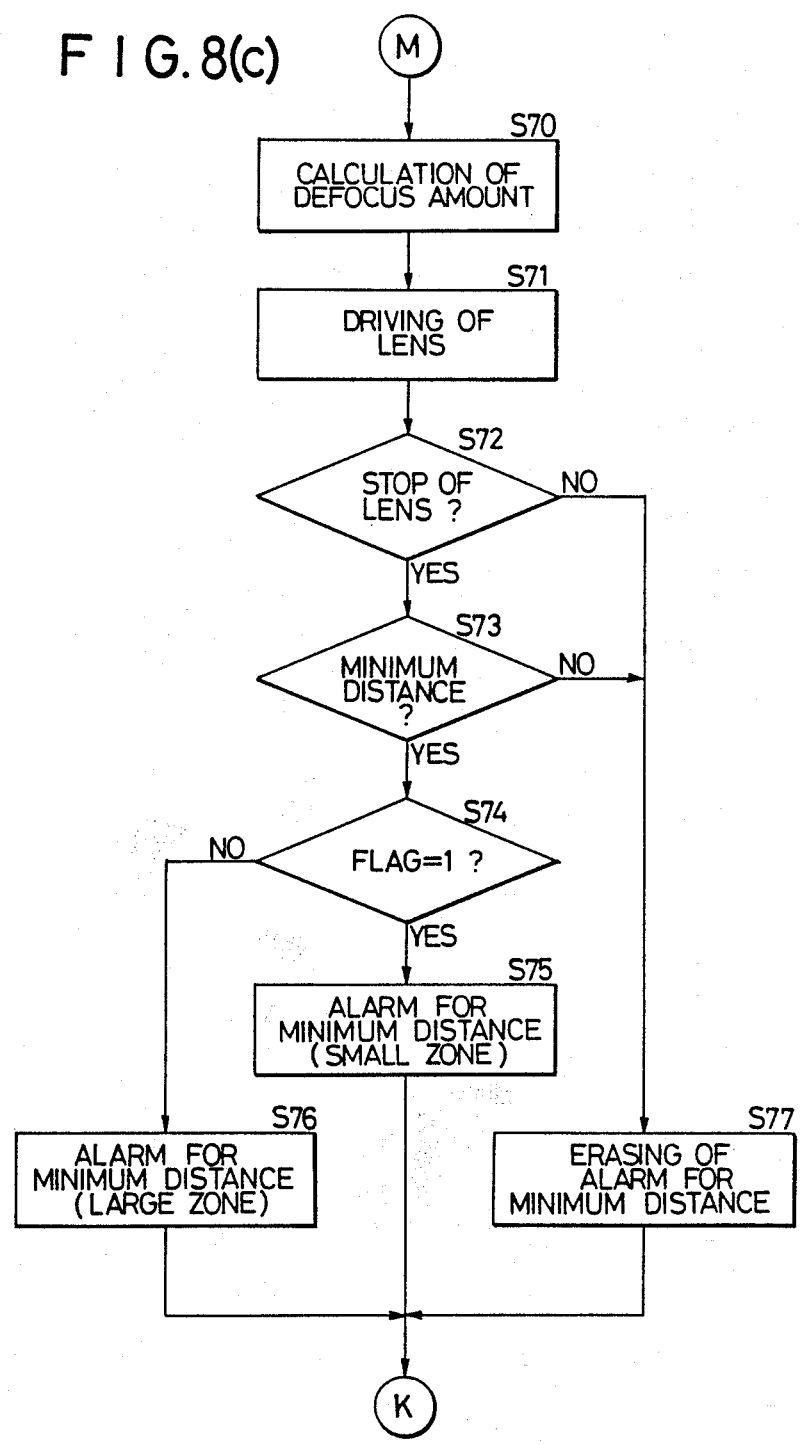

Now, with reference to a flow chart shown in FIG. 8, a third example of the processing made by the microprocessor for the switching of the focus detection zones and for the displaying of the focus detection areas in the electronic viewfinder will be described. In this example, an alarming display for impracticability of focus detection is made when the focus detection has been impracticable throughout 20 times of repeated focus detection of some object and an alarming display is made also when an object exceeds the limit of the minimum or closest object distance.

The present example will be described in the case where the focusing mode has been selected and set to an automatic focusing mode (AF) by means of a switch SW operable from outside the camera.

Upon turning on of a camera operating switch not shown and starting up of the AF, a small zone display flag F is first set to 1 for enabling the focus detection in the focus detection area corresponding to the small zone I to be displayed in the viewfinder (step S51). Then, the flag F is checked (step S52), and if F=1, a focus detection area display pattern for the small zone is displayed in the viewfinder (step S53). This is carried out by the microprocessor delivering a predetermined address to the pattern ROM 7, reading out the data for the focus detection area display pattern from the predetermined address, and outputting the same to the adder circuit 8 (refer to FIG. 1). Here, in case the flag F is found not set in step S52, step S53 is skipped over.

In step S54, integration of photo-electric current produced by light incident on the CCD is performed and after the completion of the integration, the electric charges on the all CCD picture elements are transferred to the microprocessor 9 through A/D converter 11 (step S55), and the correlation calculation for the small zone is carried out (step S56). This calculation is performed by processing the signals output from the CCD picture elements of the standard portion and the reference portion established on the line sensor and of the small focus detection zone established on the same.

First, as described above, the differential data $l_{sk}$ and $r_{sk}$ of outputs of two picture elements three picture elements apart of the CCD picture elements are obtained for the standard portion and the reference portion.

Then, the contrast $C_I$ of the small zone is obtained according to the above described equation (1), and further the correlation amounts $H_I(l)$ between the standard portion and the reference portion are obtained according to equation (3), and out of which the best correlation amount $H_I(l_{MI})$ is obtained according to equation (4). Finally, normalized amount $Y_{MI}$ of the same is obtained according to equation (5) to finish the correlation calculation.

In the next step S57, the above obtained normalized correlation value $Y_{MI}$ is compared with the preset reference value $Y_S$ for determining whether the focus detection is possible or not. As the result of this, if $Y_{MI} > Y_S$, it is thereby indicated that there is no object present enabling the focus detection in the focus detection area corresponding to the small zone, and therefore, the display for the small zone as the focus detection area display pattern being displayed in the viewfinder is erased, the focus detection area display pattern corresponding to the large zone is displayed instead, and the small zone flag F is reset (F←0) (steps S58, S59, and S60).

The correlation calculation for the large zone is then performed at step S61. That is, the same as described above, based on the differential data obtained from the CCD picture elements of the large focus detection zone on the standard portion and of the reference portion, which are established on the CCD line sensor, the contrast $C_{II}$ of the object in the focus detection area corresponding to the large zone is obtained according to equation (2), the correlation amounts $H_{II}(l)$ between the standard portion and the reference portion are obtained according to equation (8), and out of which the best correlation amount $H_{II}(l_{MII})$ is obtained according to equation (9). Finally, the normalized value $Y_{MII}$ of the same is obtained according to equation (10) to finish the correlation calculation for the large zone (step S61).

Then, in step S62, the above obtained normalized correlation amount $Y_{MII}$ is compared with the preset reference value $Y_S$ for judgment as to whether the focus detection is possible or not. As the result of this, if $Y_{MII} > Y_S$, it is thereby indicated that there is also no object enabling the focus detection present in the focus detection area corresponding to the large zone.

At that time, however, it is imaginable that the object was not present at the focus detection area by accident or because the object was on the move, and therefore, it is adapted in the present embodiment such that the focus detection in the AF mode is repeated 20 times so that the case in which the judgment of impracticability of focus detection is impracticable may be avoided as much as possible (step S63). If $Y_{MII} > Y_S$ holds true for all the correlation calculations repeated 20 times, the focus detection is at last judged to be impracticable and gives an alarm for the impracticability of the focus detection by displaying the focus detection area display pattern in the viewfinder in a different manner from that ordinarily used (step S64). The program then returns to step S52 for execution of next sequence.

The display indicating the impracticability of focus detection at that time is made as shown in FIG. 10(c), i.e., a cross (x) 43 is put in the focus detection area display pattern corresponding to the large zone.

If $Y_{MII} \leq Y_S$ is obtained as the result of the decision in step S62, i.e., if the focus detection is judged to be possible, it means that there is present an object for which the focus detection is possible in the focus detection area corresponding to the large zone. Therefore, the alarming display for impracticability of focus detection in the viewfinder is erased (step S65) and the program transfers to step S70.

If $Y_{MI} \leq Y_S$ is obtained as the result of decision in step S57, i.e., if it is judged that the focus detection is possible, it means that there is present an object with which the focus detection is possible in the focus detection area corresponding to the small zone. Therefore, the alarming display for impracticability of focus detection in the viewfinder is erased, the display of the focus detection area display pattern corresponding to the large zone is erased, the focus detection area display pattern corresponding to the small zone is displayed, and the small zone flag is set as F←1 (steps S66, S67, S68, and S69). In other words, the focus detection display pattern corresponding to the small zone is displayed only when the practicability of focus detection in the small zone is judged.

Then, in step S70, the defocus amount and its direction is calculated according to predetermined algorithm.

In step S71, the photographic lens is driven by a drive mechanism not shown including a motor according to the defocus amount and direction of defocus. And, whether the lens has stopped or not is detected through, for example, monitoring a pulse signal generated by the lens drive mechanism as the lens is moved by a predetermined amount (step S72), and when the stopping of the lens has been detected, it is further detected whether the lens has arrived at an extreme photographing distance position corresponding to the closest distance to the object, for example, by means of a limit switch provided at the extreme position or change in torque of the lens drive motor (step S73).

If, then, it is found that the lens is stopped at the extreme closest distance, it is judged whether the focus detection has been made on the large zone or on the small zone according to the state of the small zone display flag F (step S74). If it has been on the small zone, the focus detection area display pattern corresponding to the small zone in the viewfinder is intermittently blinked on and off as the alarming display for the arrival at the closest distance (step S75), and if it has been on the large zone, the focus detection area display pattern corresponding to the large zone is intermittently blinked on and off as the alarming display for the arrival at the closest distance (step S76), and thereafter the program returns to step S52 for execution of next sequence.

Figure 11:
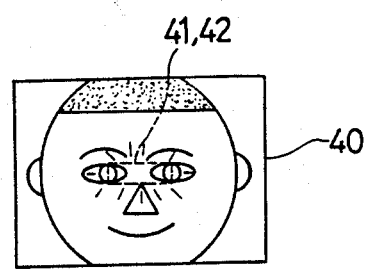
FIG. 11 is a diagram showing an example of an alarming display made in an electronic viewfinder when an object has come close to a video camera exceeding the limit of the minimum object distance.

FIG. 11 shows the appearance of the alarming display for the arrival at the closest distance made in the viewfinder.

If it is decided in step S72 that the lens is not stopped, it means that the lens is moving toward the in-focus position. If it is decided in step S73 that the extreme position corresponding to the closest distance is not yet reached, it means that the lens has stopped upon reaching the in-focus position. In either case, the alarming display for an arrival at the closest distance is erased (step S77), and the program returns to step S52 for execution of next sequence.

It may be practicable to adapt the program to return, when it is found that the lens is not stopped in step S72, to step S71 after erasing the alarming display for an arrival at the closest distance.

Further, it may also be practicable to adapt the program to repeat, when it is decided that the focus detection is impracticable as the result of the correlation calculation for the small zone in step S57, a plural times of the calculations and decisions as in the steps from step S61 to step S63.

Now, with reference to a flow chart shown in FIG. 9, a fourth example of the processing made by the microprocessor for switching of the focus detection zones and for the displaying of the focus detection areas in the electronic viewfinder will be described.

The fourth example is similar to the third example and the different point in the fourth example from the third example is as follows.

In this example, focus detection operation is repeated 20 times both on the small zone and on the large zone for avoiding the case in which the focus detection is impracticable as much as possible. Because, it is imaginable that the object was not present at the focus detection area by accident or on the moving.

Figure 9A:
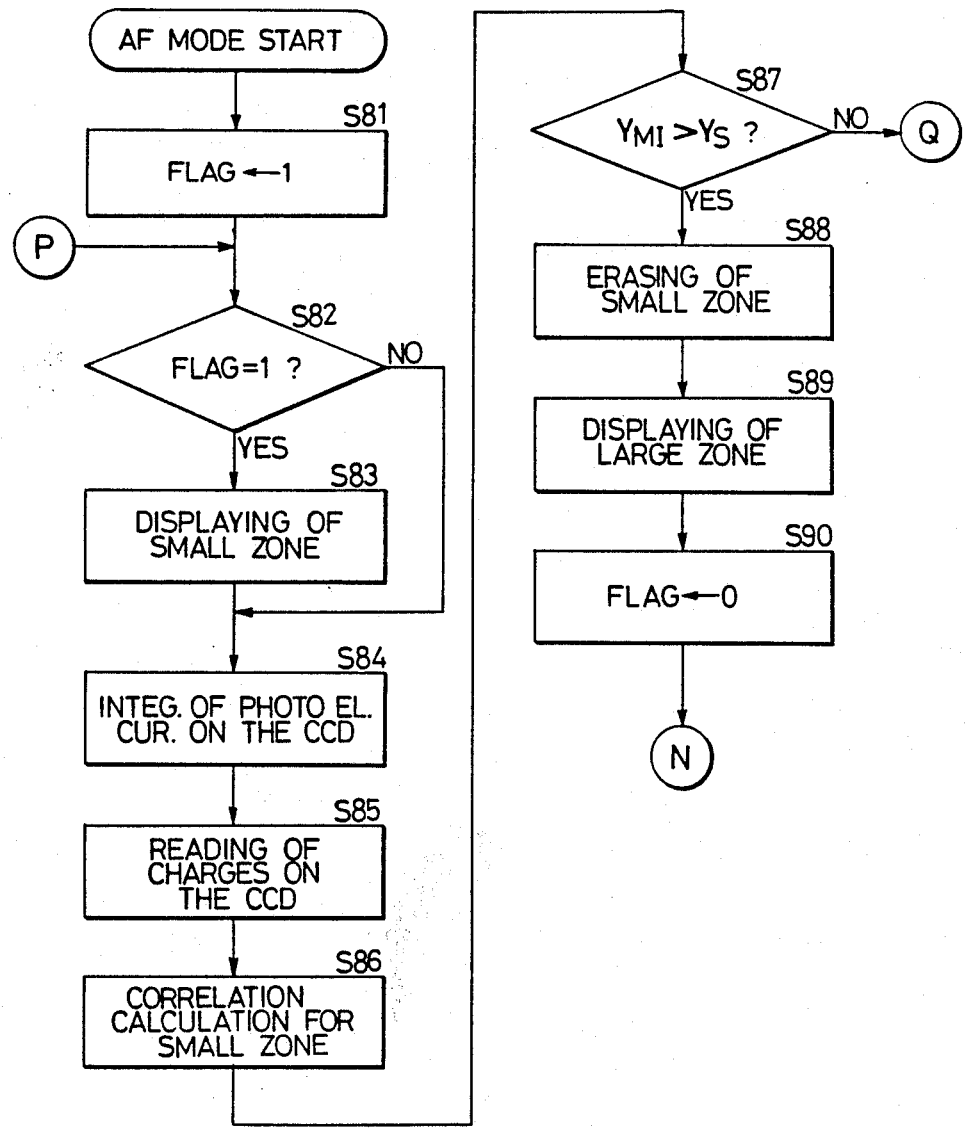
FIG. 9 is a flow chart showing a fourth example of data processing made in a microprocessor for switching of focus detection zones and displaying of focus detection areas in an electronic viewfinder.
Figure 9B:
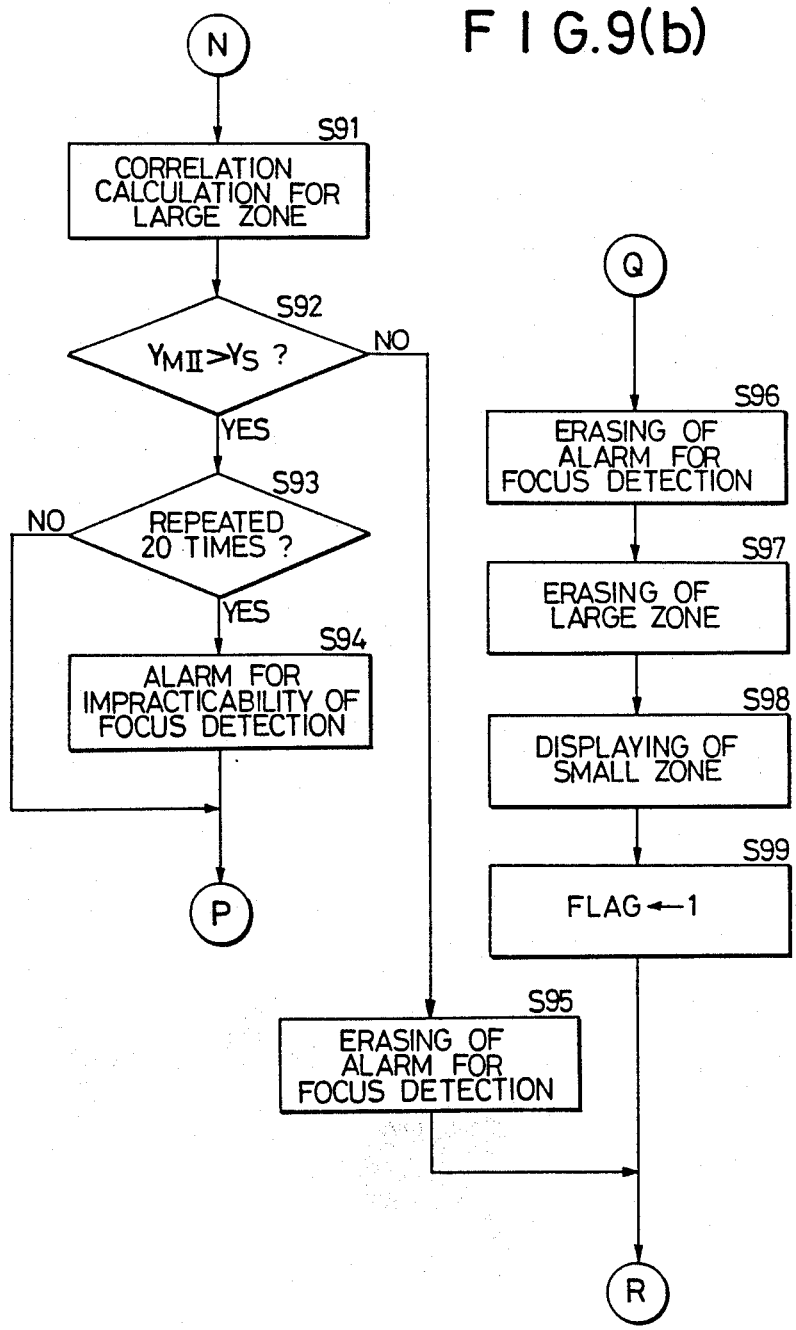

Therefore, in step S93 of the flow chart shown in FIG. 9, number of times of focus detection operation is counted and if number of times is less than 20, program transfers to step S82 and repeat the focus detection operation both on the small zone and on the large zone. If $Y_{MI} > Y_S$ and $Y_{MII} > Y_S$ hold true in the focus detection operation repeated 20 times, the focus detection is at last judged to be impracticable and gives an alarm.

Other processing in the fourth example is similar to the third example, and the program steps from step S81 to step S107 except step S93 are corresponding to the program steps from step S51 to step S77 except step S63. Therefore, no explanation will be made again.

FIG. 10(c) illustrates the alarming display for impracticability of focus detection to be made when the focus detection is decided to be impracticable, e.g., after 20 times of focus detecting operations on the large zone or on the small and large zones as described above, wherein a cross (x) 43 is displayed in the display pattern.

As the alarming display for impracticability of focus detection other than that mentioned above, the focus detection area display pattern corresponding to the large zone may be intermittently blinked on and off as shown in FIGS. 10 ($d_1$) and ($d_2$) or the focus detection area display patterns corresponding to the large zone and the small zone may be alternately displayed as shown in FIGS. 10 ($e_1$) and ($e_2$). Alarming sound or the like may also be used in combination with such display.

In the case where the alarming for impracticability of focus detection is made by blinking on and off of the focus detection area display pattern corresponding to the large zone or the small zone, the alarming display for arriving at the closest distance must be given in another manner, for which alternate displaying of two patterns, for example, as shown in FIGS. 10 ($e_1$) and ($e_2$) may be used.

Although, in the above described embodiments, the value of the best correlation amount normalized by the contrast was compared with a preset value for deciding whether or not focus detection is possible, it may also be practicable to compare the contrast value $C_I$ or $C_{II}$ itself with a preset value and thereby to decide the focus detection to be impracticable when the contrast value is lower than the preset value.

Although, in the above described embodiments, the number of the picture elements in the standard portion was changed for changing the focus detection zone on the CCD line sensor, it may be practicable instead of that to provide an optical means (e.g., a zoom lens) whereby the magnifying power for the image formed on the CCD line sensor can be varied may be disposed in the optical system for focus detection.

According to the present invention as described so far, while the focus detection is performed, the focus detection areas are automatically switched from one to the other depending on the decision made as to whether the focus detection is possible or not, the focus detection area display pattern currently set up corresponding to the switching is adapted to be displayed in the electronic viewfinder combined with the image of the object, and therefore, the operator can proceed with his picture taking constantly confirming the portion of the object in which the focus detection is being made, and hence, he never overlooks the focus detection area.

Further, when focus detection becomes impracticable for such reason as the lack of contrast of the object, it is adapted such that an alarm to the operator is given by making a special display in the pattern for displaying therein the focus detection area or making a display in a different manner from that ordinarily practiced, and when an object exceeds the limit of the minimum object distance of the photographic lens, an alarm to the operator is given by displaying the focus detection area display pattern in a different manner from that ordinarily used, e.g., by blinking it on and off, the arrangement in the viewfinder is prevented from becoming intricate or complicated. Further, when an operator at work is chasing a main object with its image formed within the focus detection area displayed in the viewfinder, he can readily take an alarm without turning his eyes to any other place, and therefore, he can promptly take any response thereto, such as changing the focal distance of the focusing lens, moving away from the object, and so on, and thereby avoid taking an out-of-focus picture.

The present invention is advantageous also from an economical viewpoint since such separate alarm display means as LEDs are not required.

While the invention has been particularly shown and described with reference to preferred embodiments thereof, it will be understood by those skilled in the art that the foregoing and other changes in form and details can be made therein without departing from the spirit and scope of the invention.

What is claimed is:

1. Focus detection condition display device for a camera, comprising:
    means for measuring light coming from object to be photographed and passing through an optical lens to output first and second light signals indicative of the amount of the light incident on predetermined first and second focus detection zones respectively,
    means for detecting the focusing condition of a photographic lens on the basis of at least one light signal out of the first and second light signals,
    means for driving said photographic lens on the basis of the result of focus detection from said focusing condition detecting means,
    a viewfinder indicating the range of an object field to be photographed,
    display means which is provided in said viewfinder and having first and second display patterns corresponding to the first and second focus detection zones on which focus detection is conducted by said focusing condition detecting means,
    judging means for judging whether focus detection by said focusing condition detecting means is possible or not, and
    alarm means for issuing an alarm signal by means of the change of the display status of the display pattern displayed in said viewfinder by said display means then focus detection is judged to be impracticable.

2. Focus detection condition display device for a camera as claimed in claim 1, further comprising an image pickup means wherein the object image formed thereon by said photographic lens is converted to a video signal, and said viewfinder is an electronic viewfinder displaying the object image photoelectrically from the video signal and includes a signal superimposing means which superimposes a signal corresponding to the first and second display patterns on the video signal.

3. Focus detection condition display device for a camera, comprising:
    means for measuring light coming from an object to be photographed and passing through an optical lens to output first and second light signals indicative of the amount of the light incident on predetermined first and second focus detection zones respectively,
    means for selecting one focus detection zone from the first and second focus detection zones, said selecting means including means for switching over the focus detection zone to another focus detection zone when focus detection is judged to be impracticable,
    means for detecting the focusing condition of a photographic lens on the basis of the light signal corresponding to the focus detection zone selected by said selecting means,
    means for driving said photographic lens on the basis of the result of focus detection from said focusing condition detecting means,
    a viewfinder indicating the range of an object field to be photographed,
    display means which is provided in said viewfinder and having first and second display patterns corresponding to the first and second focus detection zones on which focus detection is conducted by said focusing condition detecting means,
    judging means for judging whether the photographic condition of the camera is in a good condition or not, and
    alarm means issuing an alarm signal by means of the change of the display status of the display pattern displayed in said viewfinder by said display means when the photographing condition of the camera is judged to be unusual.

4. Focus detection condition display device for a camera as claimed in claim 3, further comprising an image pickup means wherein the object image formed thereon by said photographic lens is converted to a video signal, and said viewfinder is an electronic viewfinder displaying the object image photoelectrically from the video signal, and includes a signal superimposing means which superimposes the signal corresponding to the first and second display patterns on the video signal.

5. Focus detection condition display device for a camera as claimed in claim 4, wherein said judging means is a focus detection judgment means to judge whether focus detection is possible or not by said focusing condition detecting means and make operative said alarm means when focus detection is judged to be impracticable.

6. Focus detection condition display device for a camera as claimed in claim 4, wherein said judging means is an object distance judging means to judge whether the output of the focusing condition detection means shows the exceeding of the limit of the minimum object distance of said photographic lens or not, and make operative said alarm means when said photographic lens has arrived at the limit.

7. Focus detection condition display device for a camera as claimed in claim 3, wherein said alarm means intermittently blinks on and off the display pattern displayed on said viewfinder.

8. Focus detection condition display device for a camera, comprising:
means for measuring light coming from an object to be photographed and passing through an optical lens to output first and second light signals indicative of the amount of the light incident on a predetermined first focus detection zone and a predetermined second focus detection zone which includes the first focus detection zone and is larger than the first zone,
means for selecting one focus detection zone from the first and second focus detection zones,
means for detecting the focusing condition of a photographic lens on the basis of the light signal corresponding to the focus detection zone selected by said selecting means,
means for driving said photographic lens on the basis of the result of focus detection from said focusing condition detecting means,
a viewfinder indicating the range of an object field to be photographed,
display means which is provided in said viewfinder and having first and second display patterns corresponding to the first and second focus detection zones on which focus detection is conducted by said focusing condition detection means,
judging means for judging whether focus detection by said focusing condition detecting means is possible or not,
selecting control means for controlling said selecting means to select another focus detection zone when focus detection is judged to be impracticable on one focus detection zone by said judging means, and
display control means for controlling said display means so as to display the second display pattern continuously until focus detection is judged to be possible on the first focus detection zone by said judging means when said judging means judges the impracticability of focus condition on the second focus detection zone.

9. Focus detection condition display device for a camera as claimed in claim 8, further comprising an image pickup means wherein the object image formed thereon by said photographic lens is converted to a video signal, and said viewfinder is an electronic viewfinder displaying the object image photoelectrically from the video signal from the video signal and includes a signal superimposing means which superimposes the signal corresponding to the first and second display patterns on the video signal.

10. Focus detection condition display device for a camera, comprising:
means for measuring light coming form an object to be photographed and passing through an optical lens to output first and second light signals indicative of the amount of the light incident on predetermined first and second focus detection zones respectively,
means for selecting one focus detection zone from the first and second focus detection zones,
means for detecting the focus condition of a photographic lens on the basis of the light signal corresponding to the focus detection zone selected by said selecting means,
means for driving said photographic lens on the basis of the result of focus detection from said focusing condition detecting means,
a viewfinder indicating the range of an object field to be photographed,
display means which is provided in said viewfinder and having first and second display patterns corresponding to the first and second focus detection zones on which focus detection is conducted by said focusing condition detecting means,
selection control means for controlling said selecting means to select another focus detection zone when focus detection is judged to be impracticable on one focus detection zone by said judging means, and
displaying control means for controlling said display means so as to display the display pattern unchanged when focus detection is judged to be impracticable repeatedly on both focus detection zones, and after that when focus detection is judged to be possible, to switch over the display pattern corresponding to the focus detection zone on which focus detection is conducted.

11. Focus detection condition display device for a camera as claimed in claim 10, wherein the second focus detection zone includes the first focus detecting zone and is larger than the first zone.

12. Focus detection condition display device for a camera as claimed in claim 11, further comprising an image pickup means wherein the object image formed thereon by said photographic lens is converted to a video signal and said viewfinder is an electronic viewfinder displaying the object image photo-electrically from the video signal and includes a signal superimposing means which superimposes a signal corresponding to the first and second display patterns on the video signal.

13. Focus detection condition display device for a camera, comprising:
means for measuring light coming from an object to be photographed and passing through an optical lens to output first and second light signals indicative of the amount of the light incident on predetermined first and second focus detection zones respectively,
means for selecting one focus detection zone from the first and second focus detection zones,
means for detecting the focusing condition of a photographic lens on the basis of the light signal corresponding to the focus detection zone selected by said selecting means, means for driving said photographic lens on the basis of the result of focus detection from said focusing condition detecting means, judging means for judging whether focus detection by said focusing condition detecting means is possible or not, and selection control means for controlling said selecting means so that, when focus detection is judged to be impracticable on one focus detection zone by said judging means, to select another focus detection zone, furthermore, when focus detection is judged to be impracticable on said another focus detection zone by said judging means, to repeat focus detection operation a plurality of times on said another focus detection zone.

14. Focus detection condition display device for a camera as claimed in claim 13, further comprising:

a viewfinder indicating the range of an object field to be photographed, display means which is provided in said viewfinder and having first and second display patterns corresponding to the first and second focus detection zones on which focus detection is conducted by said focusing condition detecting means, and display control means for controlling said display means so that, when focus detection is judged to be impracticable repeatedly on said another focus detection zone, to change the display state of display pattern corresponding to said another focus detection zone.

15. Focus detection condition display device for a camera as claimed in claim 14, wherein said one light receiving zone is the first focus detection zone, and said another focus detection zone is the second focus detection zone which includes the first focus detection zone and is larger than the first zone.

16. Focus detection condition display device for a camera as claimed in claim 15, further comprising an image pickup means wherein the object image formed thereon by said photographic lens is converted to a video signal, and said viewfinder is an electronic viewfinder displaying the object image photoelectrically from the video signal and includes a signal superimposing means which superimposes a signal corresponding to the first and second display patterns on the video signal.

17. Focus detection device for a camera, comprising:

means for measuring light coming from an object to be photographed and passing through an optical lens to output first and second light signals indicative o: the amount of the light incident on predetermined first and second focus detection zones respectively, means for selecting one focus detection zone from the first and second focus detection zones, means for detecting the focusing condition of a photographic lens on the basis of the light signal corresponding to the focus detection zone selected by said selecting means, means for driving said photographic lens on the basis of the result of focus detection from said focusing condition detecting means, judging means for judging whether focus detection by said focusing condition detecting means is possible or not, and selecting control means for controlling said selecting means so that, when focus detection is judged to be impracticable repeatedly on one focus detection zone by said judging means, to select another focus detection zone.

* * * * *